United States Patent [19]

Terada

[11] Patent Number: 5,247,374
[45] Date of Patent: Sep. 21, 1993

[54] LIQUID CRYSTAL DISPLAY DEVICE WITH COMMON HEATER BETWEEN TWO CELLS

[75] Inventor: Toshiyki Terada, Tokyo, Japan

[73] Assignee: Stanley Electric Co., Ltd., Tokyo, Japan

[21] Appl. No.: 678,609

[22] Filed: Apr. 1, 1991

[30] Foreign Application Priority Data

Apr. 5, 1990 [JP] Japan .............................. 2-36744[U]
Apr. 5, 1990 [JP] Japan .............................. 2-36746[U]

[51] Int. Cl.$^5$ .......................... G02F 1/13; G02F 1/133
[52] U.S. Cl. ...................................... 359/44; 359/43; 359/53; 359/86
[58] Field of Search ....................... 359/44, 53, 43, 86

[56] References Cited

U.S. PATENT DOCUMENTS

| | | | |
|---|---|---|---|
| 4,119,842 | 10/1978 | Hayden et al. | 359/86 |
| 4,643,525 | 2/1987 | Haim | 359/86 |
| 5,044,732 | 9/1991 | Kimura et al. | 359/53 |

FOREIGN PATENT DOCUMENTS 0311819 12/1990 Japan ..................................... 359/86

Primary Examiner—Janice A. Howell
Assistant Examiner—Anita Pellman Gross
Attorney, Agent, or Firm—Frishauf, Holtz, Goodman & Woodward

[57] ABSTRACT

A double-layered type while/black super-twisted liquid crystal display device including a driving cell and a compensating cell in a layered structure wherein a substrate having no optical anisotropy is interposed between the driving cell and the compensating cell and a heater is arranged on the substrate is disclosed. The heater is composed of two electric conductive films, one of them being deposited on one surface of the substrate and the other one being deposited on the opposite surface of the same. In addition, a liquid crystal display device of the foregoing type wherein a heater comprising a single electric conductive thin film is interposed between the driving cell and the compensating cell is disclosed. Each thin film constituting the heater is deposited by employing a vaporizing process. Alternatively, each thin film constituting the heater may be deposited by employing a spattering process.

10 Claims, 1 Drawing Sheet

LIQUID CRYSTAL DISPLAY DEVICE WITH COMMON HEATER BETWEEN TWO CELLS

BACKGROUND OF THE INVENTION

1. Field of the Invention

The present invention relates generally to a liquid crystal display device. More particularly, the present invention relates to a double-layered type white/black super-twisted nematic liquid crystal display device including a heater.

2. Description of the Related Art

When a white/black super-twisted nematic liquid crystal display device having a double layered-structure is used at a lower temperature, it is required that the liquid display device is heated up to an elevated temperature.

To facilitate understanding of the present invention, a typical conventional (prior art) liquid crystal display device will briefly be described below with reference to FIG. 3.

In FIG. 3, reference numeral 111 designates a driving cell, reference numeral 112 designates a compensating cell, reference numerals 113 and 114 designate a polarization plate, respectively, and reference numeral 115 designates an illumination light source (back light). A heater 116 is attached to the polarization plate 113 on the driving cell 111 side.

The reason why the heater 116 is attached to the driving cell 111 side is described in the following.

An electric conductive film of an indium tin oxide, a gold or the like material deposited on the surface of an uniaxial polyester sheet by employing a vaporizing process or a spattering process is normally used to serve as a heater for the liquid crystal display device. If the heater 116 is attached to the compensating cell 112 side, the polarized state is undesirably disturbed and thereby optical characteristics of the liquid crystal display device such as a display contrast, a visual angle or the like are deteriorated remarkably.

Although the heater 116 is attached to the driving cell 111 side as shown in FIG. 3, it has been found that there arises a problem that a malfuncion of coloring occurs due to the presence of a differential temperature between the two cells.

Alternatively, arrangement of the driving cell 111 and the compensating cell 112 may be inverted relative to the illumination light source 115. In this case, the heater 116 is attached to the compensating cell 112 side, i.e., the light source 115 side. However, it has been found that there arises another problem that a property of response is degraded.

Additionally, when the heater is attached to the observer A side, an observer A directly views the heater, resulting in a quality of displaying being deteriorated remarkably.

Another conventional liquid crystal display device (not shown) is constructed such that a heater comprising such an electric conductive film as mentioned above is attached to each of the driving cell and the compensating cell.

In this case, a heating cost is increased twice. In addition, when temperature increase on the driving cell side differs from temperature increase on the compensating side due to fluctuation in electricity consumed by each of the heaters, there is a possibility that a quality of displaying is degraded. Further, since the liquid crystal display device is provided with two control systems each including a temperature sensor, circuits for the liquid crystal display device become unavoidably complicated in structure, causing the liquid crystal display device to be fabricated at an increased cost. Another problem is that an optical penetration rate is remarkably reduced because of arrangement of two heaters.

SUMMARY OF THE INVENTION

The present invention has been made with the foregoing background in mind.

An object of the present invention is to provide a double-layered type white/black super-twisted nematic liquid crystal display device of the type including a heater wherein the liquid crystal display device has an excellent quality of displaying.

Another object of the present invention is to provide a double-layered type white/black super-twisted nematic liquid crystal display device of the type including a heater wherein a quality of displaying can unchangeably be maintained, a fabrication cost can be reduced and an optical penetration rate can be improved.

To accomplish the former object, the present invention provides a double-layered type white/black super-twisted nematic liquid crystal display device including a driving cell and a compensating cell in a layered structure, wherein a substrate having no optical anisotropy is interposed between the driving cell and the compensating cell and a heater is arranged on the substrate, the heater comprising two electric conductive thin films, one of them being formed on one surface of the substrate and the other one being formed on the opposite surface of the same.

In addition, to accomplish the latter object, the present invention provides a double-layered type white/black super-twisted nematic liquid crystal display device including a driving cell and a compensating cell in a layered structure, wherein a heater comprising a single electric conductive thin film is interposed between the driving cell and the compensating cell to simultaneously heat the both cells.

Each thin film constituting the heater is deposited by employing a vaporizing process.

Alternatively, each thin film constituting the heater may be deposited by employing a spattering process.

As the heater is activated by allowing an electric current to flow through each thin film, the both cells are simultaneously and uniformly heated from the inside of the liquid crystal display device while maintaining optical characteristics of the liquid crystal display device unchangeably.

Other objects, features and advantages of the present invention will become apparent from reading of the following description which has been made in conjunction with the accompanying drawings.

BRIEF DESCRIPTION OF THE DRAWINGS

The present invention is illustrated in the following drawings in which.

DESCRIPTION OF THE PREFERRED EMBODIMENTS

Now, the present invention will be described in detail hereinafter with reference to the accompanying drawings which illustrate preferred embodiment of the present invention.

Figure 1:
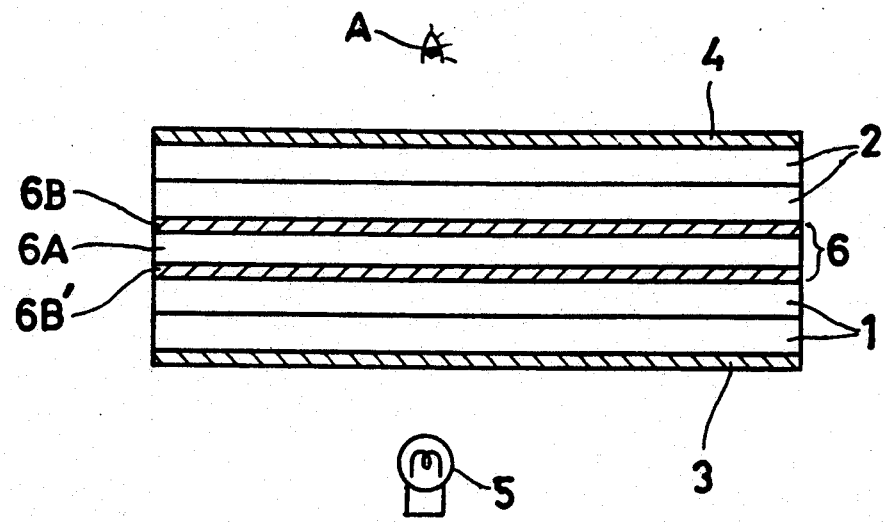
FIG. 1 is a sectional view which schematically illustrates the structure of a liquid crystal display device in accordance with a first embodiment of the present invention.

FIG. 1 is a sectional view which schematically illustrates the structure of a liquid crystal display device in accordance with a first embodiment of the present invention wherein the present invention is applied to a white/black type super-twisted nematic liquid crystal display device having a double layered-structure. In the drawing, reference numeral 1 designates a driving cell, reference numeral 2 designates a compensating cell, reference numerals 3 and 4 designate a polarization plate, respectively, reference numeral 5 designates an illuminating light source and reference numeral 6 designates a heater. The heater 6 is interposed between the driving cell 1 and the compensating cell 2.

The heater 6 is constructed such that electric conductive thin films 6B and 6B' of an indium tin oxide, a gold or the like material (each serving as a heating element) are deposited on opposite surfaces of a substrate 6A molded of a material having no optical anisotropy (e.g., a glass, an anaxial polyethyrene terephthalate or the like material) by employing a vaporizing process or a spattering process.

When the liquid crystal display device constructed in the above-described manner is used at a lower temperature, the heater 6 is first activated by allowing an electric current to flow through the thin films 6B and 6B'. As a heat is generated by the thin films 6B and 6B', the driving cell 1 and the compensating cell 2 are substantially uniformly heated at the same time. This assures that a displaying operation is performed with the liquid crystal display device without an occurrence of deterioration of optical characteristics of the liquid crystal display device of the present invention, e.g., coloring due to the presence of a differential temperature between the driving cell and the compensating cell. It should be added that the displaying operation is performed without disturbance of the polarized state of the liquid crystal display device. Consequently, an observer A can clearly view items appearing on the liquid crystal display device of the present invention.

It should be noted that the heater 6 may be activated such that an electric current flows through only one of the thin films 6B and 6B'. In addition, arrangement of the driving cell 1 and the compensating cell 2 may be inverted relative to the optical source 5 without any variation in respect of operation and function of the liquid crystal display device.

Next, description will be made below with respect to a liquid crystal display device in accordance with a second embodiment of the present invention with reference to FIG. 2 which schematically illustrates a structure of the liquid crystal display device. This embodiment is concerned also with a case where the present invention is applied to a while/black type super-twisted nematic liquid crystal display device having a double layered-structure.

Figure 2:
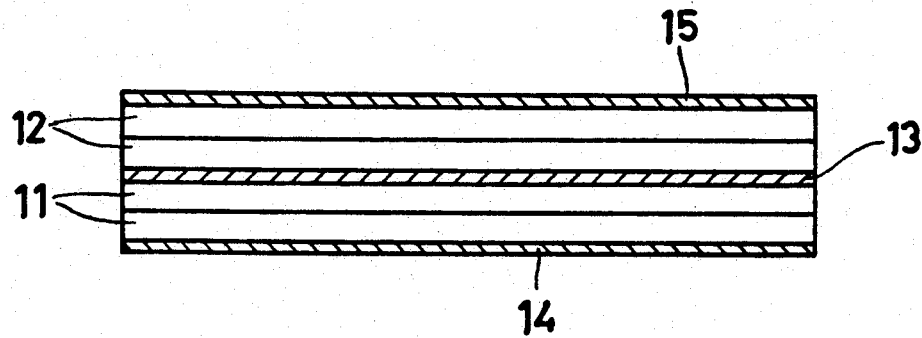
FIG. 2 is a sectional view which schematically illustrates the structure of a liquid crystal display device in accordance with a second embodiment of the present invention.

In FIG. 2, reference numeral 11 designates a driving cell, reference numeral 12 designates a compensating cell, reference numeral 13 designates a heater interposed between the both cells 11 and 12 to simultaneously heat them and reference numerals 14 and 15 designate a polarization plate, respectively.

The heater 13 comprises an electric conductive thin film of an indium tin oxide, a gold or the like material which is deposited on the driving cell 11 or the compensating cell 12 by employing a vaporizing process or a spattering process.

It should be noted that the driving cell 11 and the compensating cell 12 are brought in close contact with each other in the clamped state with the aid of a frame or the like means (not shown).

When the liquid crystal display device is used at a lower temperature, the heater 13 is first activated by allowing an electric current to flow through the thin film. As a heat is generated by the heater 13, the driving cell 11 and the compensating cell 12 are substantially uniformly heated at the same time, whereby a displaying operation is performed without an occurrence of deterioration of optical characteristics of the liquid crystal display device, e.g., coloring due to the presence of a differential temperature between the driving cell 11 and the compensating cell 12.

As is apparent from the above description, according to the first embodiment of the present invention, since the liquid crystal display device is constructed such that electric conductive thin films of an indium tin oxide, a gold or the like material are formed on opposite surfaces of a substrate molded of a material having no optical anisotropy to serve as heating elements and a heater composed of the thin films is interposed between the driving cell and the compensating cell, the liquid crystal display device can substantially uniformly be heated without any disturbance of the polarized state of the liquid crystal display device. Additionally, since the both cells are substantially uniformly heated at the same time, there is no possibility that deterioration of optical characteristics of the liquid crystal display device, e.g., coloring due to the presence of a differential temperature between the driving cell and the compensating cell takes place.

According to the second embodiment of the present invention, the liquid crystal display device includes a heater which is interposed between the driving cell and the compensating cell to simultaneously heat them. With this construction, the liquid crystal display device assures that the both cells can substantially uniformly be heated at the same time by a single heater without an occurrence of deterioration of optical characteristics of the liquid crystal display device, e.g., coloring due to the presence of a differential temperature between the driving cell and the compensating cell. In addition, since the liquid crystal display device includes merely a single heating circuit, it can be fabricated at an inexpensive cost. Another advantageous feature is that an optical penetration rate can be improved, because a single heater is required for the liquid crystal display device.

While the present invention has been described above with respect to two preferred embodiments thereof, it should of course be understood that the present invention should not be limited only to them but various changes or modifications may be made without departure from the scope of the invention as defined by the appended claims.

What is claimed is:

1. A layered white and black super-twisted nematic liquid crystal display device comprising:

a driving cell and a compensating cell formed in a layered structure;

a substrate having no optical anisotropy, said substrate having first and second surfaces, and substrate being interposed between said driving cell and said compensating cell;

a common heater arranged on said substrate for heating both said driving cell and said compensating cell, said common heater including first and second electrically conductive thin films; and said first thin film being formed on said first surface of said substrate and said second thin film being formed on said second surface of the substrate.

2. The liquid crystal display device according to claim 1, wherein at least one of said first and second thin films comprises a vapor deposited film.

3. The liquid crystal display device according to claim 1, wherein at least one of said first and second thin film comprises a sputtered film.

4. The liquid crystal display device according to claim 1, wherein said driving cell is positioned on a side of said substrate that faces an illumination light source and said compensating cell is positioned on a side of said substrate that faces an observer.

5. The liquid crystal display device according to claim 1, wherein said driving cell is positioned on a side of said substrate that faces an observer and the compensating cell is positioned on a side of said substrate that faces an illuminating light source.

6. A layered type white and black super-twisted nematic liquid crystal display device comprising:

a driving cell and a compensating cell formed in a layered structure;

a common heater interposed between said driving cell and said compensating cell for simultaneously heating both said driving cell and said compensating cell; and wherein said heater comprises a single electrically conductive thin film.

7. The liquid crystal display device according to claim 6, wherein said single thin film is formed on an inner surface of said driving cell that faces an illuminating light source.

8. The liquid crystal display device according to claim 6, wherein said single thin film is formed on an inner surface of said compensating cell that faces an observer.

9. The liquid crystal display device according to claim 6, wherein said thin film comprises a vapor deposited film.

10. The liquid crystal display device according to claim 6, wherein said thin film heater comprises a material sputtered on a surface of at least one of said driving cell and said compensating cell.

* * * * *

UNITED STATES PATENT AND TRADEMARK OFFICE
CERTIFICATE OF CORRECTION

PATENT NO. : 5,247,374
DATED : September 21, 1993
INVENTOR(S) : TERADA

It is certified that error appears in the above-indentified patent and that said Letters Patent is hereby corrected as shown below:

Title page, Item [57] ABSTRACT, line 1,

"while" should be --white--

Figure 3:
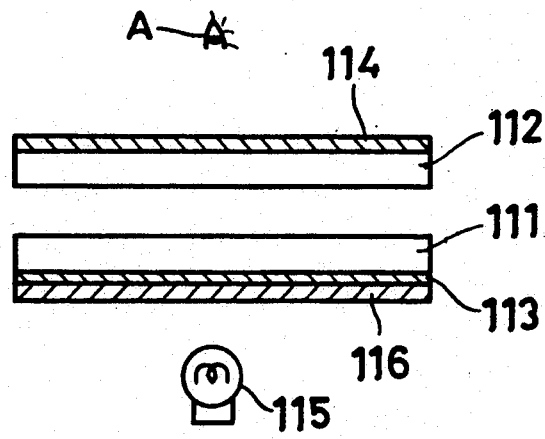
FIG. 3 is a sectional view which schematically illustrates the structure of a typical conventional liquid crystal display device.

In the Drawings, after "FIG.3" insert --(Prior Art)--

Signed and Sealed this

Twenty-fourth Day of September, 1996

Attest:

BRUCE LEHMAN

Attesting Officer  Commissioner of Patents and Trademarks